(12) United States Patent
Kwon et al.

(10) Patent No.: US 7,484,024 B2
(45) Date of Patent: Jan. 27, 2009

(54) APPARATUS AND METHOD FOR INTERRUPT SOURCE SIGNAL ALLOCATION

(75) Inventors: Min-Do Kwon, Yongin-si (KR); Seoung-Hwan Cho, Suwon-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 0 days.

(21) Appl. No.: 11/064,857

(22) Filed: Feb. 25, 2005

(65) Prior Publication Data
US 2005/0193157 A1 Sep. 1, 2005

(30) Foreign Application Priority Data
Feb. 27, 2004 (KR) ............ 10-2004-0013570

(51) Int. Cl.
*G06F 13/26* (2006.01)
(52) U.S. Cl. .................. 710/264; 710/266
(58) Field of Classification Search .......... 710/260–269
See application file for complete search history.

(56) References Cited

U.S. PATENT DOCUMENTS

| | | | | |
|---|---|---|---|---|
| 4,275,458 | A * | 6/1981 | Khera | 710/262 |
| 5,218,703 | A * | 6/1993 | Fleck et al. | 710/264 |
| 6,539,448 | B1 * | 3/2003 | Deng | 710/260 |
| 6,618,780 | B1 | 9/2003 | Popat | |
| 6,694,398 | B1 * | 2/2004 | Zhao et al. | 710/260 |
| 6,725,309 | B1 * | 4/2004 | Kim | 710/260 |
| 6,813,666 | B2 * | 11/2004 | Joffrain | 710/264 |
| 2004/0177192 | A1 * | 9/2004 | Pezzini | 710/260 |

FOREIGN PATENT DOCUMENTS

| | | |
|---|---|---|
| JP | 10-260930 | 9/1998 |
| KR | 1997-66903 | 10/1997 |
| KR | 1999-0066213 | 8/1999 |
| KR | 1020030028601 | 4/2003 |

OTHER PUBLICATIONS

KS32C50100 RISC Interrupt Controller, Samsung.*
8259A Programmable Interrupt Controller (8259A/8259A-2), Intel, Dec. 1988.*
Chinese Office Action issued in Chinese Patent Application No. 200510071666.7 dated Dec. 14, 2007 with English language translation.

* cited by examiner

*Primary Examiner*—Khanh Dang
(74) *Attorney, Agent, or Firm*—Harness, Dickey & Pierce, PLC

(57) ABSTRACT

An apparatus and method for interrupt source signal allocation is provided. An interrupt controller may include an interrupt source allocation unit, an interrupt pending register, a control register, a priority register, and/or an interrupt request signal generator. The interrupt source allocation unit may output one or more interrupt source signals based on one or more priorities, and may allow a user to move an individual interrupt source signal without moving other interrupt source signals. The interrupt pending register may set bits in one or more registers corresponding to the interrupt source signals. The control register may control and transmit the interrupt source signals corresponding to the set bits. The priority register may determine the priorities of the interrupt source signals. The interrupt request signal generator may output an interrupt request signal in response to one or more interrupt source signals received from the priority register.

27 Claims, 5 Drawing Sheets

APPARATUS AND METHOD FOR INTERRUPT SOURCE SIGNAL ALLOCATION

BACKGROUND OF THE INVENTION

This application claims the priority of Korean Patent Application No. 2004-13570, filed on Feb. 27, 2004, in the Korean Intellectual Property Office, the disclosure of which is herein incorporated entirety by reference in its entirety.

1. Field of the Invention

The present invention relates to an interrupt controller, for example, an interrupt controller which may allocate interrupt source signals. The interrupt controller may perform priority based allocation of interrupt source signals received concurrently by the interrupt controller.

2. Description of the Related Art

A microprocessor may have an interrupt controller used for processing interrupt source signals. If a plurality of interrupt source signals are generated concurrently, then a priority may be assigned to each of the interrupt source signals to determine which of the interrupt source signals to process first.

To determine priorities for interrupt source signals, a register may be used to set bits, for example, bits which identify interrupt source signals generated by a plurality of modules. Priorities for interrupt source signals may be determined based on bits set in the register.

FIG. 1 is a block diagram illustrating an example structure of a conventional interrupt controller. Referring to FIG. 1, the interrupt controller 100 may include, for example, an interrupt pending register 10, a control register 20, a priority register 30, and an interrupt request signal generator 40. Also, a central processing unit (CPU) 50 may be included in the block diagram of FIG. 1 for explanation purposes related to the operation of the interrupt controller 100.

An example operation of the block diagram illustrated in FIG. 1 may include inputting an interrupt source signal (IS) to the interrupt pending register 10. The interrupt pending register 10 may include a register that manages interrupt source signals having different priority levels. For example, if two or more interrupt source signals are generated concurrently, then the interrupt pending register 10 may give priority to the interrupt source signal having the highest assigned priority. Determining the priority of the interrupt source signals may include referencing bits set in a register to identify the priority levels of the interrupt source signals.

The control register 20 of FIG. 1 may perform one or more control operations. Performing a control operation may include, for example, determining whether to perform a mask operation to mask an input interrupt source signal (IS) and/or to support a vector function for the interrupt controller 100. The control register 20 may transmit interrupt source signals to the priority register 30 that correspond to one or more sets of bits of the interrupt pending register 10.

The priority register 30 of FIG. 1 may include a logic circuit which determines the priorities of the interrupt source signals by using a fixed technique or a round-robin technique. The interrupt source signals may be located in a master block, which may divide the input interrupt source signals into one or more groups and control the individual groups.

The interrupt request signal generator 40 of FIG. 1 may generate an interrupt request signal (IRQ) in response to one or more interrupt source signals received from the output of the priority register 30. If CPU 50, for example, receives the interrupt request signal (IRQ) from request signal generator 40, then the CPU 50 may identify which interrupt source signal has been generated. FIG. 2 is a schematic diagram illustrating the structure of a conventional priority register 30 of FIG. 1. Referring to FIG. 2, the priority register 30 may include, for example, five registers (REG1~REG5). It may be assumed for example purposes, that the interrupt controller 100 of FIG. 1 has a 32-bit bus capable of performing 32 interrupt signal operations at a time.

An example operation of FIG. 2 may include the first through the fourth registers (REG1~REG4) each receiving eight corresponding interrupt source signals (IS1~IS7, IS8~IS16, IS17~IS24 and IS25~IS32), and determining priorities for each of the four sets of eight interrupt source signals. The four registers (REG1~REG4) may each output an interrupt source signal having a highest priority to the fifth register (REG5) once the priorities of the interrupt source signals have been determined. The fifth register (REG5) may receive the highest priority signals from the four registers (REG1~REG4), and the fifth register (REG5) may output an interrupt source signal having the highest priority among the signals received.

A frequently generated interrupt source signal may be given a higher priority for faster processing, which may increase the performance of an interrupt controller and/or a system having an interrupt controller. Interrupt source signals with low priorities may be processed infrequently or not at all, depending on whether an interrupt source signal with a higher priority is generated too frequently. If, for example, interrupt source signals that have a lower priority are not processed, the system operation may be dysfunctional. As the number of interrupt source signals increases, determining the priority level of the interrupt source signals may help to increase the performance of the interrupt controller 100.

The interrupt controller 100, according to an example embodiment of the present invention, may be designed to adjust the priorities of interrupt source signals. The interrupt source signals may be divided into separate groups, as shown in FIG. 2. The priorities of interrupt source signals may be adjusted based on the assigned groups and/or the priorities may be further adjusted among the interrupt source signals within each group. Example techniques that may be used for determining the priorities of interrupt source signals may include a fixed and/or a round-robin technique.

The fixed technique may be used to determine priorities for groups based on a set of priorities, however, the fixed technique may overlook lower priority interrupt source signals. For example, an interrupt source signal of a higher priority group may be generated more frequently than an interrupt source signal of a lower priority group. If a user desires to input an interrupt source signal, the fixed technique may not permit the interrupt source signal to be moved independently of its respective group to a different register. Referring to FIG. 2, a user may desire to move an input signal, for example IS25 of REG4, to the first register REG1 to allow the interrupt source signal IS25 to be processed faster. Using the fixed technique, the user may not be able to move the interrupt source signal IS25 to the first register REG1 without also moving all of the interrupt source signals IS25~IS32 of the fourth register REG4. The fixed technique may not permit a user to freely control the order that interrupt source signals are handled by the interrupt controller 100.

The round-robin technique may assign the interrupt source signals with priorities that are not fixed. An example of round-robin may include assigning a lowest priority to the first interrupt source signal processed, and assigning a highest priority to the interrupt source signal with the next highest priority. However, changing the priority of an interrupt source signal may not be easily accomplished, for example, in a real-time system, it may be difficult to predict the order the interrupt source signals will be processed.

The interrupt controller 100 of FIG. 1 may be operating in a 32-bit bus system. The interrupt controller 100 may include one or more registers suitable for handling 32 bits. A 32-bit register may provide allocation for 32 interrupt source signals, however, interrupt source signal generated in excess of 32 may not be processed.

SUMMARY OF THE INVENTION

The example embodiments of the present invention provide an interrupt controller that allows a user to allocate one or more interrupt source signals. Example embodiments of the present invention may include using a fixed technique and/or a round-robin technique for determining priorities of interrupt source signals. Further, example embodiments of the present invention may permit the number of interrupt source signals that may be processed to increase.

An example embodiment of the present invention may provide an interrupt controller including an interrupt source allocation unit, an interrupt pending register, a control register, a priority register, and an interrupt request signal generator. The interrupt source allocation unit may receive at least two interrupt source signals and output m (m is a natural number) interrupt source signals based on a priority. The interrupt pending register may sets bits corresponding to the m interrupt source signals output from the interrupt source allocation unit. The control register may control and transmit the interrupt source signals corresponding to the set bits. The priority register may determine the priorities of the m interrupt source signals and output at least one of the m interrupt source signals according to the determined priorities. The interrupt request signal generator may output at least one interrupt request signal in response to the at least one interrupt source signal from the priority register.

Example embodiments may also provide the interrupt source allocation unit having first through m-th selection units, each of which may select and output at least one the m interrupt source signals based on at least one selection signal.

Example embodiments may further provide an interrupt source signal output from the first selection unit having a highest priority, and an m-th interrupt source signal output from an m-th selection unit having a lowest priority.

Example embodiments may still further provide the at least one selection being controlled by a central processing unit (CPU), and where at least one of the m selection units selects the at least one interrupt source signal having a priority corresponding to the at least one selection signal.

Example embodiments may further include a selection register which generates the at least one selection signal, and an interrupt source signal expansion unit that stores at least one exceeding interrupt source signal as a sub-interrupt source signal, if the number of interrupt source signals exceeds m.

Example embodiments may also further include an expansion register, an inverted AND unit, an inverted OR unit, and a selection unit. The expansion register may store the sub-interrupt source signals. The inverted AND unit may perform an inverted AND operation on the sub-interrupt source signals. The inverted OR unit may perform an inverted OR operation on the sub-interrupt source signals. The selection unit may select and output at least one of the output of the inverted AND unit and the output of the inverted OR unit in response to a polarity signal. The selection unit may output the output of the inverted OR unit when the polarity signal is a first logic level, and may output the output of the inverted AND unit when the polarity signal is a second logic level. The number of the interrupt source signal expansion units may be equal to m. If the sub-interrupt source signals are activated then the first and second logic levels may be the same.

Another example embodiment of the present invention may include a method for interrupt source signal allocation. The method may provide receiving at least two interrupt source signals, outputting m (m is a natural number) interrupt source signals based on a priority level, setting bits corresponding to the interrupt source signals output from the interrupt source allocation unit, transmitting the interrupt source signals corresponding to the set bits, determining priorities of the interrupt source signals being input, and outputting at least one of the interrupt source signals according to the priorities determined, and outputting an interrupt request signal in response to an interrupt source signal from the priority register.

Another example embodiment of the present invention may include an interrupt source allocation unit and a selection register. The interrupt source allocation unit may include m selection units (m is a natural number greater than 2) which each receive m interrupt source signals and at least one selection signal, wherein at least one of the m selection units outputs an interrupt source signal among the m interrupt source signals in response to the at least one selection signal received. The selection register may generate the at least one selection signal and select at least one of the m interrupt source signals based on the priorities of the m interrupt source signals.

Example embodiments of the present invention may include a central processing unit (CPU) that allows a user to change the priority of at least one of the m interrupt source signals.

Example embodiments of the present invention may further include determining the priorities of the m interrupt source signals by using at least one of a round-robin technique and a fixed technique.

Another example embodiment of the present invention may include a method that includes selecting at least one of m (m is a natural number greater than 2) interrupt source signals based on priorities of the m interrupt source signals, generating at least one selection signal based on the at least one interrupt source signal selected, receiving said m interrupt source signals and the at least one selection signal, and outputting the at least one interrupt source signal selected in response to the at least one selection signal received.

Another example embodiment of the present invention may include an interrupt source allocation unit and a priority register. The interrupt source allocation unit may include m selection units (m is a natural number greater than 2) which each receive m interrupt source signals. At least one of the m selection units may output at least one of the m interrupt source signals in response to at least one selection signal received. The priority register may include at least two registers, wherein at least one of the at least two registers may store one or more bits corresponding to the at least one of the m interrupt source signals output from the interrupt source allocation unit.

Example embodiments of the present invention may provide storing an interrupt source signal received having a highest priority in a first bit position of one of the at least two registers, and storing an interrupt source signal received having a lowest priority in a last bit position of the register.

Another example embodiment of the present invention is an apparatus that includes an interrupt source allocation unit and an expansion unit. The interrupt source allocation unit may include m selection units (m is a natural number greater than 2) which each receive m interrupt source signals, wherein at least one of the m selection units outputs at least one of the m interrupt source signals in response to at least one selection signal received. The expansion unit may store excess interrupt source signals received in excess of m, wherein at least one of the excess interrupt source signals are output to the interrupt source allocation unit in response to an interrupt request signal.

Example embodiments of the present invention may further include an expansion register, an inverted AND unit, an inverted OR unit, and a selection unit, which selects and outputs a selection signal corresponding to the output of at least one of the inverted AND unit and the inverted OR unit, wherein the selection signal corresponds to the at least one excess interrupt source signal.

BRIEF DESCRIPTION OF THE DRAWINGS

The present invention will become more apparent by describing in detail example embodiments thereof with reference to the attached drawings in which.

DETAILED DESCRIPTION OF EXAMPLE EMBODIMENTS OF THE PRESENT INVENTION

Figure 1:
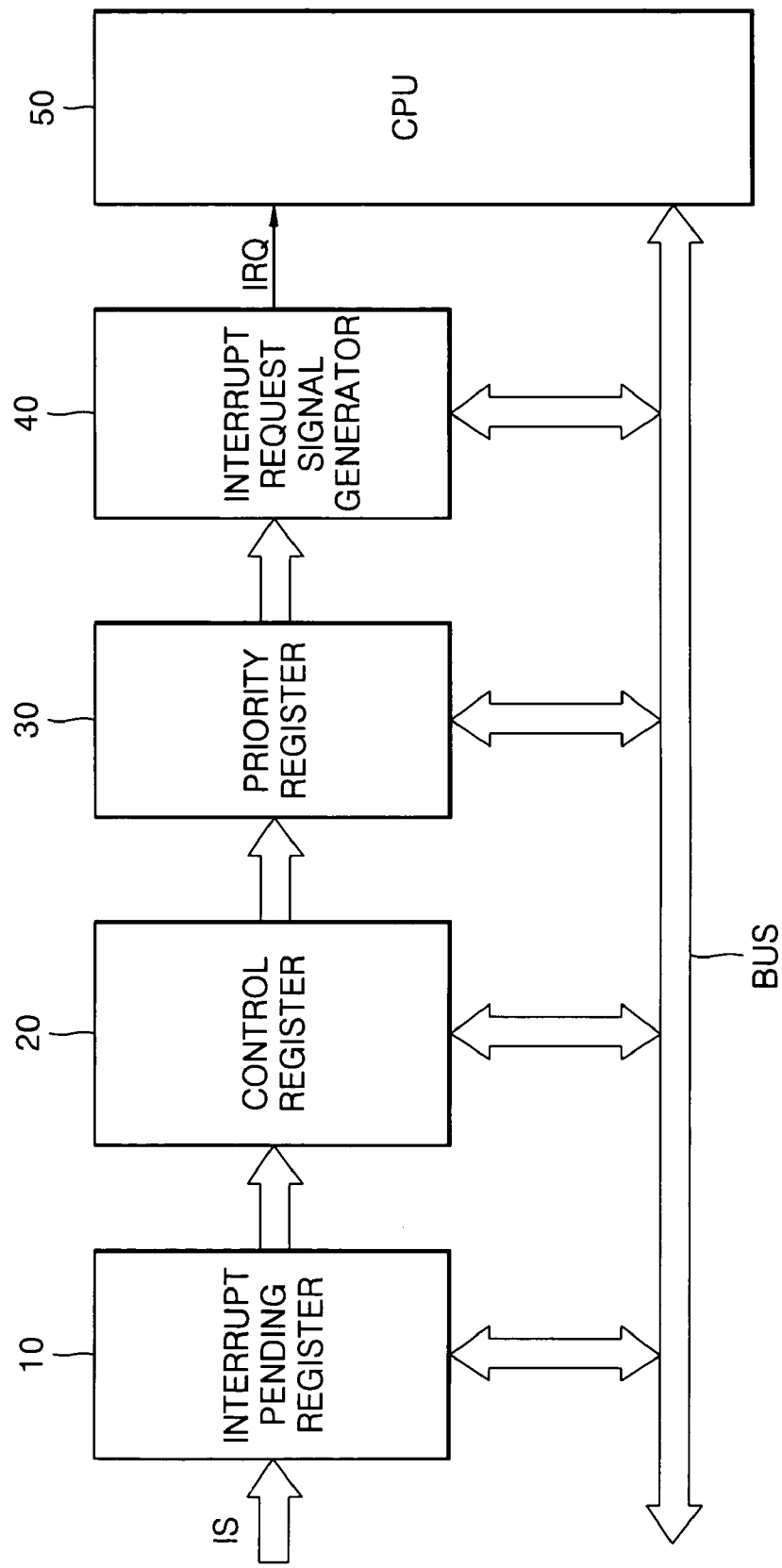
FIG. 1 is a block diagram illustrating the structure of a conventional interrupt controller.
Figure 2:
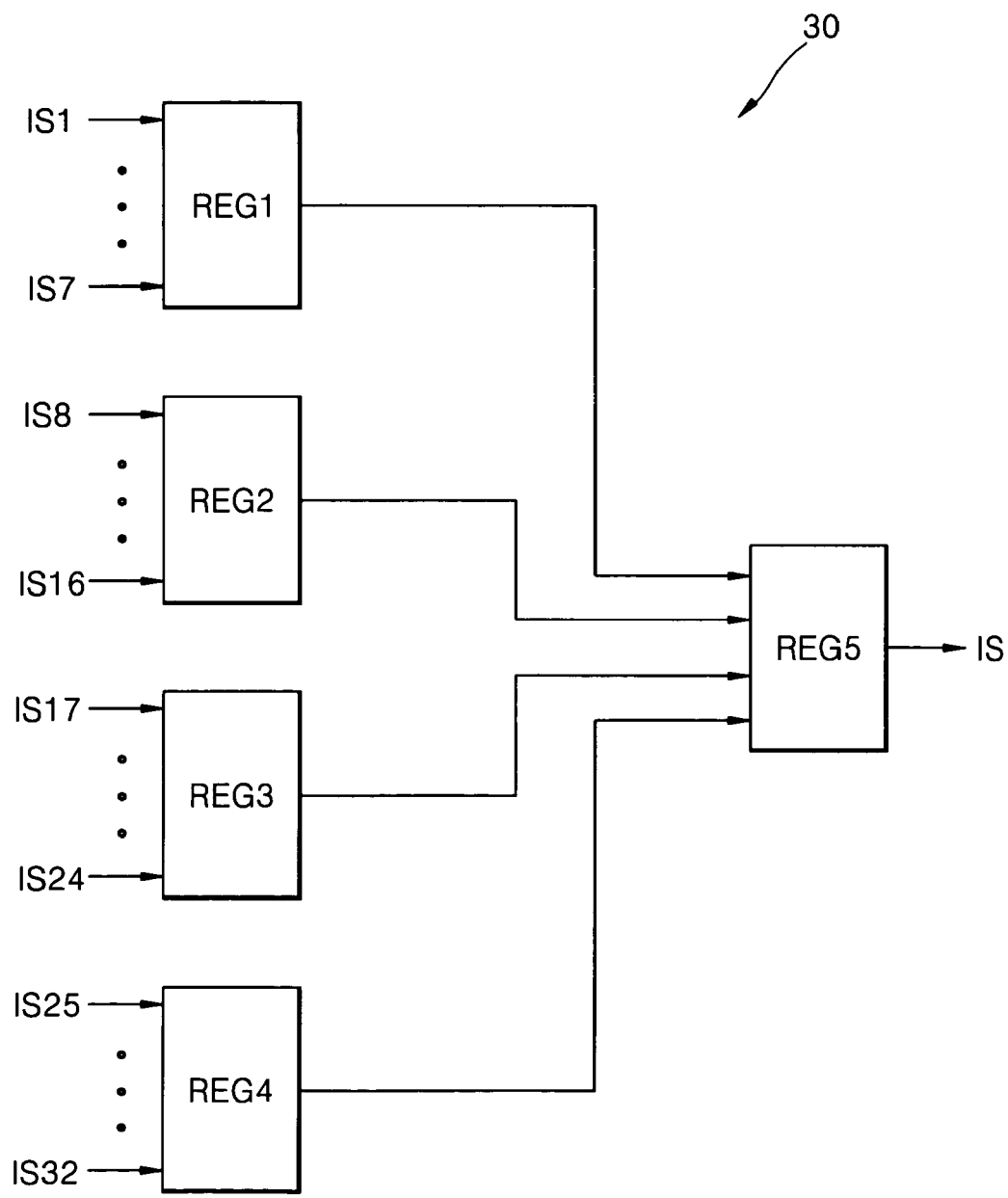
FIG. 2 illustrates a schematic diagram of the priority register 30 of FIG. 1.

Hereinafter, example embodiments of the present invention will be described in detail with reference to the attached drawings. In the drawings, like reference numerals refer to like elements.

Figure 3:
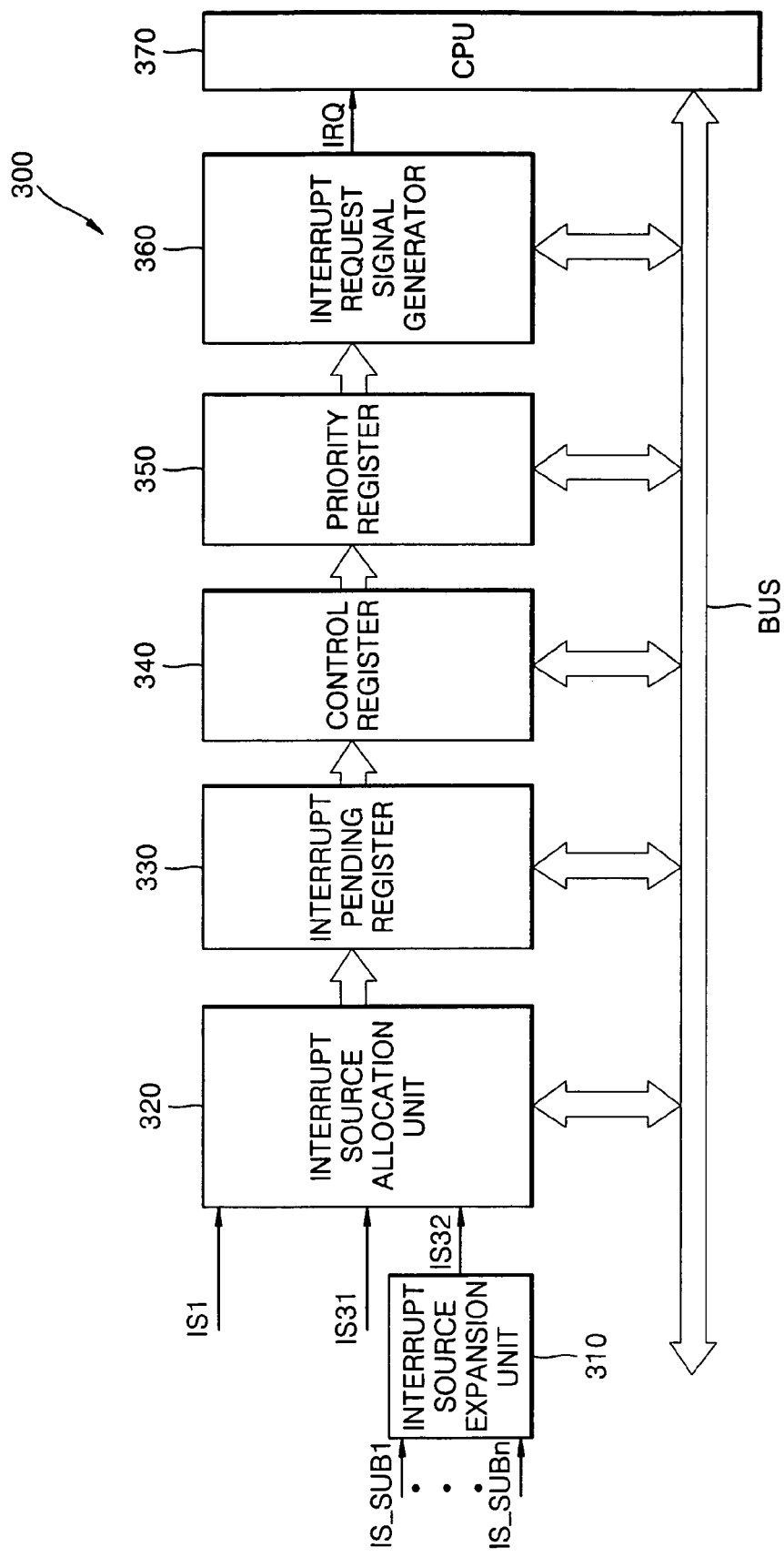
FIG. 3 is a block diagram illustrating the structure of an interrupt controller according to an example embodiment of the present invention.

FIG. 3 illustrates the structure of an interrupt controller, according to an example embodiment of the present invention. Referring to FIG. 3, the interrupt controller 300 may include an interrupt source allocation unit 320, an interrupt pending register 330, a control register 340, a priority register 350, and/or an interrupt request signal generator 360. Also, a central processing unit (CPU) 370 illustrated in FIG. 3, need not be a component of the interrupt controller 300, but has been included in FIG. 3 for explanation purposes related to the operation of the interrupt controller 300.

The interrupt source allocation unit 320, according to an example embodiment of the present invention, may output m (m is a natural number) interrupt source signals. An example operation of the interrupt source allocation unit 320 may include receiving input interrupt source signals, for example IS1~IS32, and outputting one or more of these signals based on priority. The priority may be arbitrarily assigned to one or more of the interrupt source signals.

The interrupt pending register 330, according to an example embodiment of the present invention, may set bits in one or more registers. The bits may be set to correspond with the interrupt source signals output from the interrupt source allocation unit 320.

The control register 340, according to an example embodiment of the present invention, may control and transmit the interrupt source signals based on the configuration of set bits.

The priority register 350, according to an example embodiment of the present invention, may determine the priorities of the interrupt source signals and output the interrupt source signals based on their assigned priorities.

The interrupt request signal generator 360, according to an example embodiment of the present invention, may output one or more interrupt request signals in response to one or more interrupt source signals being output from the priority register 350.

Figure 4:
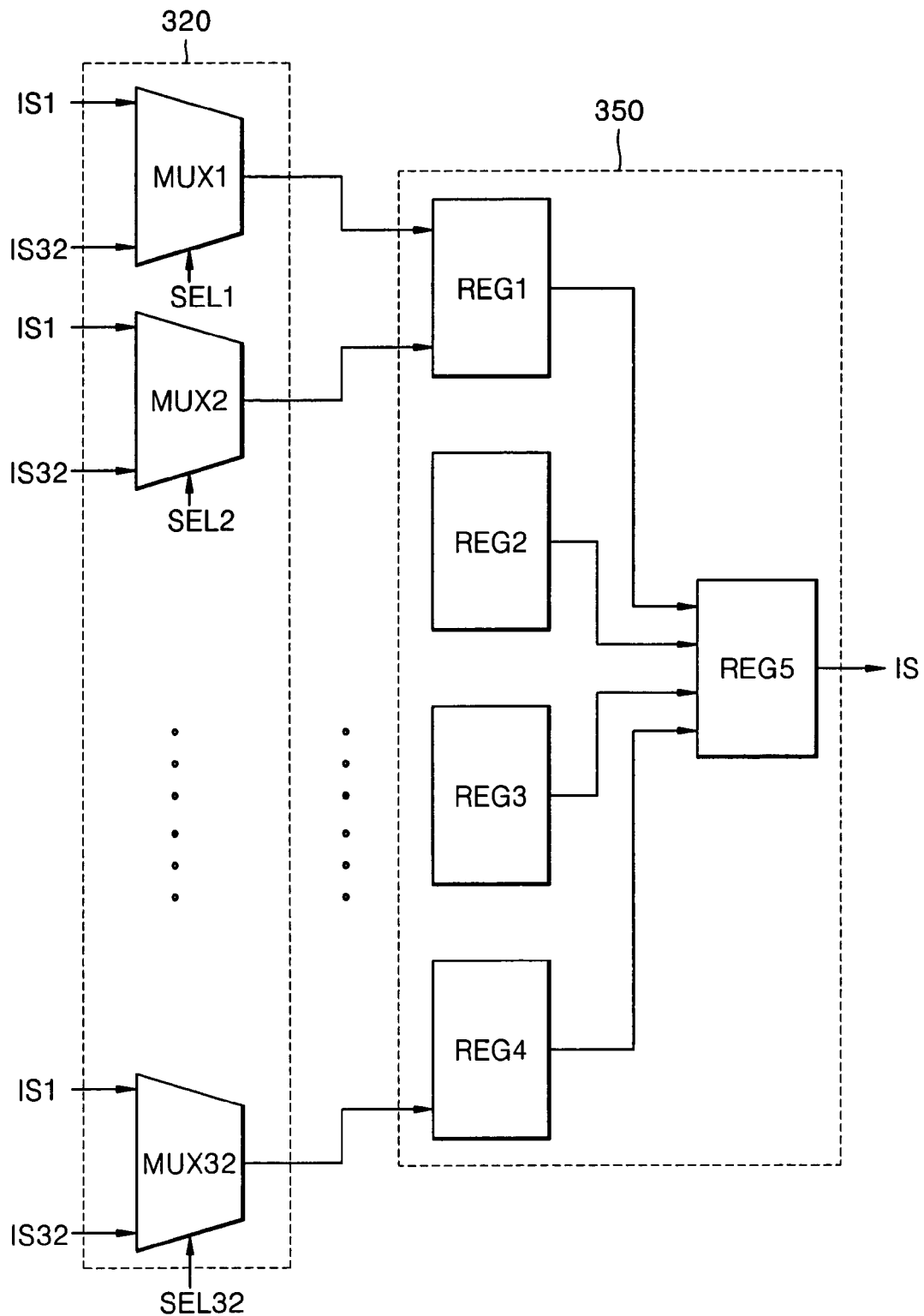
FIG. 4 illustrates an example schematic diagram of the interrupt source allocation unit 320 and the priority register 350 of FIG. 3.

FIG. 4 is a schematic diagram illustrating the structures of the interrupt source allocation unit 320 and the priority register 350 of FIG. 3. Referring to FIG. 4, the interrupt source allocation unit 320 may include m selection units (MUX1~MUX32), where m may be, for example, any number between 1 and 32. In response to a selection signal (SEL1~SEL32), the selection units (MUX1~MUX32) may select and output one interrupt source signal among the m interrupt source signals (IS1~IS32) received.

Referring to FIGS. 3 and 4, the operation of the interrupt controller 300 according to an example embodiment of the present invention will now be described in greater detail.

The functions of the interrupt pending register 330 and the control register 340 may be similar in operation to the conventional interrupt pending register 10 and control register 20 illustrated in FIG. 1. Therefore, the details of these components will be omitted from further discussion.

The interrupt source allocation unit 320, according to an example embodiment of the present invention, may output m (m is a natural number) interrupt source signals (IS1~IS32) according to one or more arbitrarily assigned priorities. Number m may be an arbitrary natural number, and for convenience of explanation, it may be assumed that m is 32.

In FIGS. 3 and 4, according to an example embodiment of the present invention, 32 interrupt source signals (IS1~IS32) are illustrated.

The interrupt source allocation unit 320, according to an example embodiment of the present invention, may be a register used to perform a switch function. The register may, for example, allocate 32 interrupt source signals (IS1~IS32) by arbitrarily assigning priority bits to the first bit through the 32nd bit of the interrupt source signals (IS1~IS32). The interrupt source allocation unit 320 may output the prioritized interrupt source signals (IS1~IS32) to the interrupt pending register 330.

The interrupt pending register 330, according to an example embodiment of the present invention, may output the interrupt source signals (IS1~IS32) to the control register 340, which may output the interrupt source signals (IS1~IS32) to the priority register 350.

In the conventional interrupt controller 100 of FIG. 1, described above, the user may not be able to control the order in which an interrupt source signal is processed. If the user desires to have, for example, interrupt source signal IS25 moved to the input of the first register REG1, which may provide faster processing than REG4, then all the interrupt source signals currently designated to REG4 may have to be moved to REG1. As a result, the user may not be capable of arbitrarily controlling the processing order of an individual interrupt source signal.

The interrupt source allocation unit 320 according to an example embodiment of the present invention may permit the user to select a single interrupt source signal, for example IS25, and change its designated register for faster processing.

Interrupt source signals (IS1~IS32) may be divided into four groups. The interrupt source signals (IS1~IS32) may be input to respective registers (REG1~REG4) of the priority register. The priorities among the registers (REG1~REG4) and/or the priorities among the individual interrupt source signals (IS1~IS32) may determined, for example, by using a fixed technique or a round-robin technique.

The interrupt source allocation unit 320, according to an example embodiment of the present invention, may include first through m-th selection units (MUX1~MUX32). For example purposes, it may be assumed that m is 32. The m selection units (MUX1~MUX32) may each select and output one interrupt source signal among the m interrupt source signals in response to one or more selection signals (SEL1~SEL32), which may be provided by corresponding selection units. The 32 interrupt source signals (IS1~IS32) may be input to each of the selection units (MUX1~MUX32). The selection units (MUX1~MUX32) may, for example, each output one interrupt source signal in response to a corresponding selection signal (SEL1~SEL32) received.

It may be assumed for the following example that the technique used for determining the priorities of interrupt source signals is a fixed technique. Using the fixed technique, 8 interrupt source signals may be input to the first register (REG1) of the priority register 350, and may be assigned higher priorities than interrupt source signals input to the second register (REG2). The Interrupt source signal having the highest priority among the 8 interrupt source signals input to the first register (REG1) may be represented by the first bit of the first register (REG1) and an interrupt source signal having the lowest priority may be represented by the eighth bit of the first register (REG1).

The 25-th interrupt source signal (IS25) among the 32 interrupt source signals (IS1~IS32) may be, for example, the first interrupt source signal to be input to and/or processed by the interrupt source allocation unit 320. A first selection signal (SEL1) may control the first selection unit (MUX1) to select the first interrupt source signal (IS25). The first selection unit (MUX1) may forward the first interrupt source signal (IS25) to the first register (REG1) in response to the first selection signal (SEL1). The selection signals (SEL1~SEL32) may be controlled by the CPU 370. The first through the m-th selection signals (SEL1~SEL32) may select the order that the interrupt source signals are processed based on the priorities assigned to the interrupt source signals.

Figure 5:
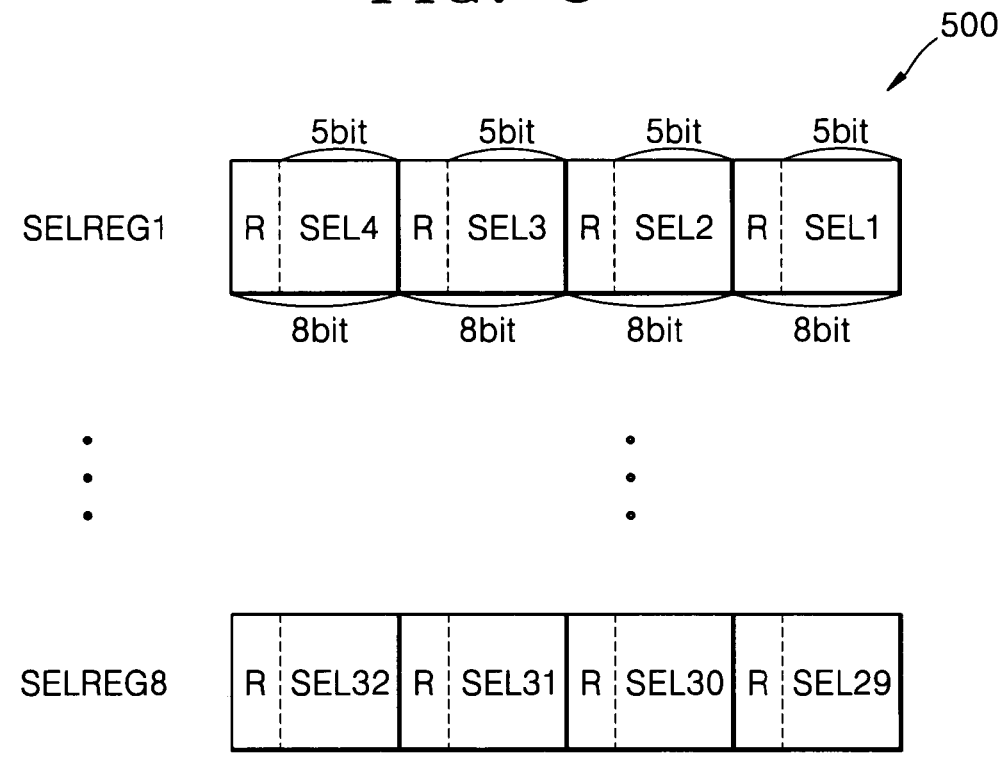
FIG. 5 illustrates an example schematic diagram of a selection register generating a selection signal.

FIG. 5 is a schematic diagram illustrating the structure of a selection register generating a selection signal, according to an example embodiment of the present invention. The interrupt controller 300 of FIG. 3 may include a selection register 500 for generating the selection signals (SEL1~SEL32). The selection register 500 may include, for example, 8 registers (SELREG1~SELREG8) each of which may be 32 bits in length. One register may be divided into 48-bit parts as illustrated in an example illustration (SELREG1) of FIG. 5. The CPU 370 may write data for 5 bits of the 8-bit register (i.e., the SEL1-SEL4 portions of SELREG1), and the written data may be output as a selection signal. The remaining 3 bits (R) may be unused for the purposes related to this example embodiments of the present invention.

If the CPU 370 writes, for example '11001' for a lowest 5 bits (SEL1) in a first register (SELREG1) of the selection register 500, then '11001' may be provided to the first selection unit (MUX1) as a first selection signal (SEL1). As a result, the first selection unit (MUX1) may select and output the interrupt source signal (IS25) in response to the first selection signal (SEL1). The CPU 370 may write data for the 8 registers (SELREG1~SELREG8) of the selection register 500, to generate the 32 selection signals (SEL1~SEL32).

The interrupt source allocation unit 320 may include 32 selection units (MUX1~MUX32) which may arbitrarily allocate interrupt source signals (IS1~IS32) to the priority register 350. The arbitrary allocation of interrupt source signals may be performed in response to one or more of the first through the 32nd selection signals (SEL1~SEL32). The interrupt source signals (IS1~IS32) may be allocated in a priority order desired by the user.

Determining priorities of interrupt source signals using a fixed technique may include, for example, processing an interrupt source signal corresponding to the first bit of the first register (REG1) first and processing an interrupt source signal corresponding to the last bit of the fourth register (REG4) last.

If, for example, 32 interrupt source signals (IS1~IS32) are input to the priority register 350 in an arbitrary order, then the arbitrary order may become the priority order of the interrupt source signals (IS1~IS32). The user may be able to adjust the priorities of the interrupt source signals (IS1~IS32) by using the CPU 370 and/or the interrupt source allocation unit 320, and provide the interrupt source signals to the priority register 350.

A round-robin technique may be used for determining the priority of the interrupt source signals of the priority register 350. The priorities of the interrupt source signals (IS1~IS32) may be adjusted by using the interrupt source allocation unit 320.

Figure 6:
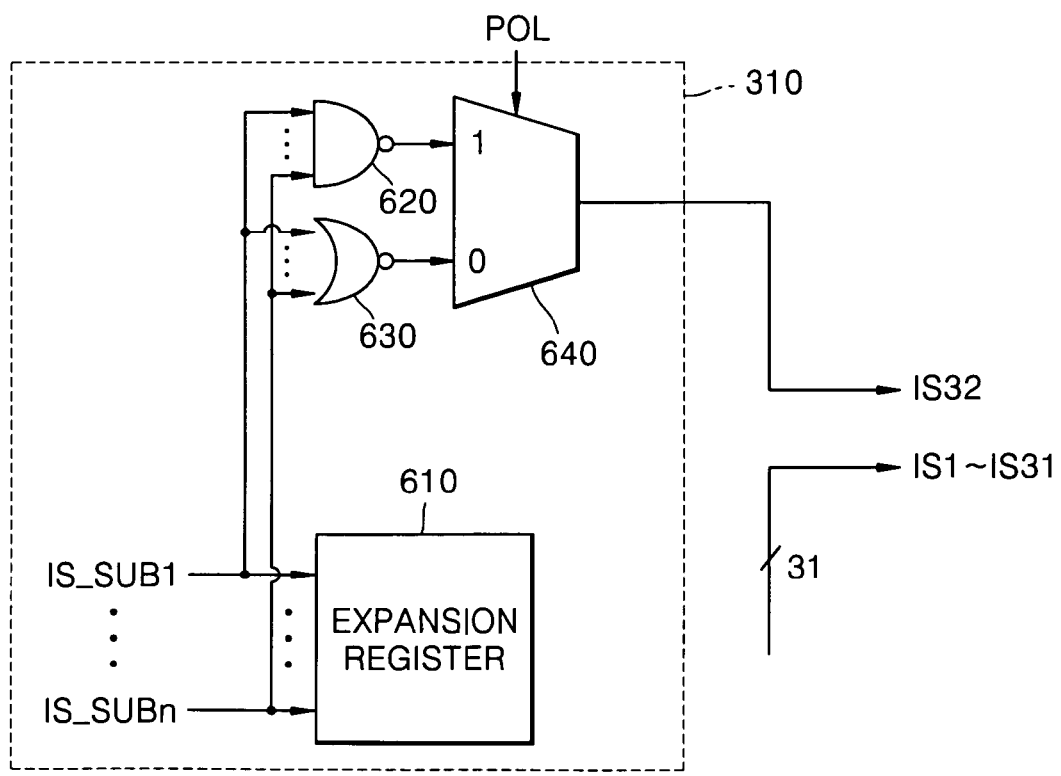
FIG. 6 illustrates an example schematic diagram of an interrupt source signal expansion unit 310 of FIG. 3.

FIG. 6 is a schematic diagram illustrating the structure of an interrupt source signal expansion unit 310 of FIG. 3. Referring to FIG. 6, the interrupt source signal expansion unit 310 may include an expansion register 610, an inverted AND unit 620, an inverted OR unit 630, and/or a selection unit 640.

The interrupt controller 300 of FIG. 3 may include an interrupt source signal expansion unit 310, which may receive and store interrupt source signals that exceed a maximum specified number of anticipated interrupt source signals (i.e., if m>32). Excess interrupt source signals may be stored as sub-interrupt source signals (IS_SUB1~IS_SUBn). Assuming, for example, that m is 32 then if the number of interrupt source signals generated exceeds 32, the storage capacity of the registers may be exceeded in one or more of the subcomponents 320, 330, 340, and/or 350 of the interrupt controller 300. If excess interrupt source signals are received, then they may be stored in the interrupt source signal expansion unit 310 as sub-interrupt source signals (IS_SUB1~IS_SUBn).

The expansion register 610 illustrated in FIG. 6 may store the sub-interrupt source signals (IS_SUB1~IS_SUBn). The inverted AND unit 620 may perform an inverted AND operation on one or more of the sub-interrupt source signals (IS_SUB1~IS_SUBn), and/or the inverted OR unit 630 may perform an inverted OR operation on one or more of the sub-interrupt source signals (IS_SUB1~IS_SUBn).

The selection unit 640, according to an example embodiment of the present invention, may select and output the output of the inverted AND unit 620 and/or the output of the inverted OR unit 630 in response to a polarity signal (POL). The selection unit 640 may output, for example, the output of the inverted OR unit 630 when the polarity signal (POL) is at a first logic level, and/or output the output of the inverted AND unit 620 when the polarity signal (POL) is at a second logic level. For example, if 36 interrupt source signals are input to the interrupt controller 300, which may only be capable of processing 32 interrupt source signals (IS1~IS32) at a time, then the interrupt controller 300 may not be able to process the 4 excess interrupt source signals. In this case, the interrupt source signal expansion unit 310 may receive the 4 excess interrupt source signals and store them as sub-interrupt source signals (IS_SUB1~IS_SUBn), which may be later activated as regular interrupt source signals and output to the interrupt source allocation unit 320.

Activation for one or more sub-interrupts source signals may require a specified logic level. For example, if a logic level 'high' is specified as the level at which one or more sub-interrupt source signals may be activated, then the sub-interrupt source signals (IS_SUB1~IS_SUBn) may be activated when the logic level is 'high'.

The expansion register 610 may store the 4 sub-interrupt source signals (IS_SUB1~IS_SUBn). If an interrupt request signal is received by the CPU 370 in response to one of the 4 sub-interrupt source signals (IS_SUB1~IS_SUBn), the CPU 370 may read the contents of the expansion register 610 and discover whether a module (not shown) is requesting an interrupt operation that corresponds to one or more of the sub-interrupt source signals (IS_SUB1~IS_SUBn). As a result, a first sub-interrupt source signal (IS_SUB1) may be activated while the remaining sub-interrupt source signals (IS_SUB2~IS_SUBn) may be inactive.

The inverted AND unit 620 may perform an inverted AND operation on one or more of the sub-interrupt source signals (IS_SUB1~IS_SUBn) and generate a 'high' logic level output signal. The inverted OR unit 630 may perform an inverted OR operation on one or more of the sub-interrupt source signals (IS_SUB1~IS_SUBn) and generate a 'low' logic level output. If, for example, a sub-interrupt source signal is activated for a 'high' logic level, then the polarity signal (POL) generated may also be a 'high' logic level.

The selection unit 640 may select and output the output of the inverted AND unit 620 in response to the polarity signal (POL). The output of the selection unit 640 may be generated at a 'high' logic level and provided as an interrupt source signal to the interrupt source allocation unit 320. If the output of the selection unit 640 is generated at a 'high' logic level then one of the sub-interrupt source signals (IS_SUB1~IS_SUBn) may be activated to be an interrupt source signal.

The CPU 370 may read the contents of the expansion register 610 and determine which module may have generated an interrupt source signal. The interrupt source signal expansion unit 310, illustrated in FIG. 3, may permit interrupt source signals in excess of a specified number of interrupt source signals to be processed by the interrupt controller 300. The capacity level for the interrupt controller 300 may be, for example, 32 interrupt source signals (IS1~IS32). An interrupt source signal expansion unit may also receive 32 interrupt source signals and store them as 32 corresponding sub-interrupt source signals. Therefore, the capacity of interrupt source signals which may be received by the interrupt controller 300 of FIG. 3 may be 64 (32 interrupt source signals and 32 sub-interrupt source signals).

As described above, according to the example embodiments of the present invention, allocating interrupt source signals may include using a fixed and/or a round-robin technique to determine the priorities of the interrupt source signals. In another example a user may allocate an interrupt source signal to a priority register. Further, the number of interrupt source signals that may be processed by an interrupt controller may be increased by one or more expansion registers.

While the present invention has been particularly shown and described with reference to example embodiments thereof, it will be understood by those of ordinary skill in the art that various changes in form and details may be made therein without departing from the spirit and scope of the present invention as defined by the following claims.

What is claimed is:

1. An interrupt controller comprising:
   an interrupt source allocation unit that permits arbitrary user controllable selection of a processing order of an interrupt source signal and which receives at least two interrupt source signals and outputs interrupt source signals based on an arbitrary priority level of at least one selection signal received from a central processing unit;
   an interrupt pending register which sets bits corresponding to the interrupt source signals output from the interrupt source allocation unit;
   a control register which controls and transmits the interrupt source signals corresponding to the set bits;
   a priority register which determines priorities for the interrupt source signals and outputs at least one of said interrupt source signals according to the priorities; and
   an interrupt request signal generator which outputs at least one interrupt request signal in response to said at least one interrupt source signal from the priority register.

2. The interrupt controller of claim 1, wherein the interrupt source allocation unit comprises selection units, each of which selects and outputs at least one of the interrupt source signals based on at least one selection signal.

3. The interrupt controller of claim 2, wherein a first interrupt source signal output from a first selection unit of the selection units has a highest priority, and a another interrupt source signal output from another selection unit has a lowest priority.

4. The interrupt controller of claim 3, wherein the at least one selection signal is controlled by the central processing unit (CPU), and at least one of the selection units select the at least one interrupt source signal having a priority corresponding to the at least one selection signal.

5. The interrupt controller of claim 1, further comprising:
   a selection register which generates the at least one selection signal.

6. The interrupt controller of claim 1, further comprising:
   an interrupt source signal expansion unit that stores at least one exceeding interrupt source signal if the number of interrupt source signals exceeds a threshold.

7. The interrupt controller of claim 6, wherein the at least one exceeding interrupt source signal is stored as a sub-interrupt source signal.

8. The interrupt controller of claim 7, wherein the interrupt source signal expansion unit comprises:
   an expansion register which stores at least two sub-interrupt source signals;
   an inverted AND unit which performs an inverted AND operation on said sub-interrupt source signals;
   an inverted OR unit which performs an inverted OR operation on said sub-interrupt source signals; and
   a selection unit which selects and outputs at least one of the output of the inverted AND unit and the output of the inverted OR unit in response to a polarity signal.

9. The interrupt controller of claim 8, wherein the selection unit outputs the output of the inverted OR unit when the polarity signal is a first logic level, and outputs the output of the inverted AND unit when the polarity signal is a second logic level.

10. The interrupt controller of claim 6, wherein the interrupt source signal expansion unit includes interrupt source signal expansion units.

11. The interrupt controller of claim 9, wherein if the at least two sub-interrupt source signals are activated then the first and second logic levels are the same.

12. The interrupt controller of claim 1, wherein, one or more registers of the interrupt controller are changeable according to a user selected interrupt source signal.

13. A method for interrupt source signal allocation comprising:
    receiving at least two interrupt source signals;
    outputting interrupt source signals based on an arbitrary priority level of at least one selection signal;
    setting bits corresponding to the interrupt source signals output from the interrupt source allocation unit;
    transmitting the interrupt source signals corresponding to the set bits;
    determining priorities of the interrupt source signals; and
    outputting at least one said interrupt source signals according to the priorities determined, and outputting an arbitrary interrupt request signal in response to one or more of the interrupt source signals.

14. An interrupt controller for performing the method of claim 13.

15. An apparatus comprising:
    an interrupt source allocation unit including at least three selection units which each receive interrupt source signals and at least one arbitrary selection signal, wherein at least one of said at least three selection units outputs at least one of said interrupt source signals in response to the at least one arbitrary selection signal received; and
    a selection register which selects at least one of said interrupt source signals based on the priorities of the interrupt source signals and generates the at least one arbitrary selection signal.

16. The apparatus of claim 15, further comprising:
    a central processing unit (CPU), wherein a user changes the priority of at least one of said interrupt source signals via the CPU.

17. The apparatus of claim 15, wherein the priorities of the interrupt source signals are determined by at least one of a round-robin technique and a fixed technique.

18. The apparatus of claim 15, further comprising:
    an interrupt pending register which sets bits corresponding to the interrupt source signals;
    a control register which controls and transmits the interrupt source signals corresponding to the set bits;
    a priority register which determines priorities of the interrupt source signals and outputs at least one of said interrupt source signals based on the priorities;
    an interrupt request signal generator which outputs at least one interrupt request signal in response to at least one of said interrupt source signals received from the priority register.

19. A method comprising:
    selecting at least one of at least three interrupt source signals based on an arbitrarily set priority level of the at least three interrupt source signals;
    generating at least one selection signal based on the at least one interrupt source signal selected;
    receiving said at least three interrupt source signals and the at least one selection signal; and
    outputting the at least one interrupt source signal selected in response to the at least one selection signal received.

20. The method of claim 19, further comprising:
    setting bits corresponding to the at least three interrupt source signals;
    transmitting the at least three interrupt source signals corresponding to the set bits;
    determining the priorities of the at least three interrupt source signals;
    outputting at least one of said at least three interrupt source signals based on the priorities determined; and
    outputting an interrupt request signal in response to said at least one of said at least three interrupt source signals received.

21. An interrupt controller for performing the method of claim 19.

22. An apparatus comprising:
    interrupt source allocation unit including at least three selection units which each receive interrupt source signals, wherein at least one of said at least three selection units outputs at least one of the interrupt source signals in response to at least one arbitrary selection signal received; and
    a priority register including at least two registers, wherein at least one of the at least two registers stores one or more bits corresponding to the at least one of the interrupt source signals output from the interrupt source allocation unit.

23. The apparatus of claim 22, wherein the priority register stores an interrupt source signal received having a highest priority in a first bit position of one of said at least two registers, and stores an interrupt source signal received having a lowest priority in a last bit position of said register.

24. An apparatus comprising:
    an interrupt source allocation unit including at least three selection units which each receive interrupt source signals, wherein at least one of said at least three selection units outputs at least one of said interrupt source signals in response to at least one arbitrary selection signal received; and
    an expansion unit which stores excess interrupt source signals received in excess of a threshold, wherein at least one of said excess interrupt source signals are output to the interrupt source allocation unit in response to an arbitrary interrupt request signal.

25. The apparatus of claim 24, further comprising:
    a central processing unit (CPU); and
    an interrupt request signal generator which generates the interrupt request signal and provides the interrupt request signal to the CPU, wherein the CPU reads the contents of the expansion unit and determines which of the at least one excess interrupt source signals to output to the interrupt source allocation unit.

26. The apparatus of claim 25, wherein the at least one excess interrupt source signal is activated prior to being output.

27. The apparatus of claim 24, wherein the expansion unit comprises:
    at least one expansion register for storing the excess interrupt source signals;
    an inverted AND unit;
    an inverted OR unit; and
    a selection unit, which selects and outputs the selection signal corresponding to the output of at least one of the inverted AND unit and the inverted OR unit, wherein the selection signal corresponds to the at least one excess interrupt source signal.

* * * * *